H. B. GARMAN.
BEARING.
APPLICATION FILED AUG. 17, 1909.

964,859.

Patented July 19, 1910.

WITNESSES
M. P. Williamson
S. M. Gallagher

INVENTOR
Harry B. Garman

BY
ATTORNEY

UNITED STATES PATENT OFFICE.

HARRY B. GARMAN, OF OTTAWA, ILLINOIS.

BEARING.

964,859. Specification of Letters Patent. Patented July 19, 1910.

Application filed August 17, 1909. Serial No. 513,247.

*To all whom it may concern:*

Be it known that I, HARRY B. GARMAN, a citizen of the United States, residing at Ottawa, in the county of Lasalle and State of Illinois, have invented a certain new and useful Improvement in Bearings, of which the following is a specification.

My invention relates to a new and useful improvement in bearings, and has for its object to construct a bearing which will be especially adapted for use in connection with cream separators and the like.

A further object of the invention is to provide a bearing which will be readily and easily adjusted for increasing the tension to prevent vibration of the spindle.

A still further object of the invention is to provide a bearing which will rest upon the spindle in very few places, thus eliminating the friction to a great extent.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
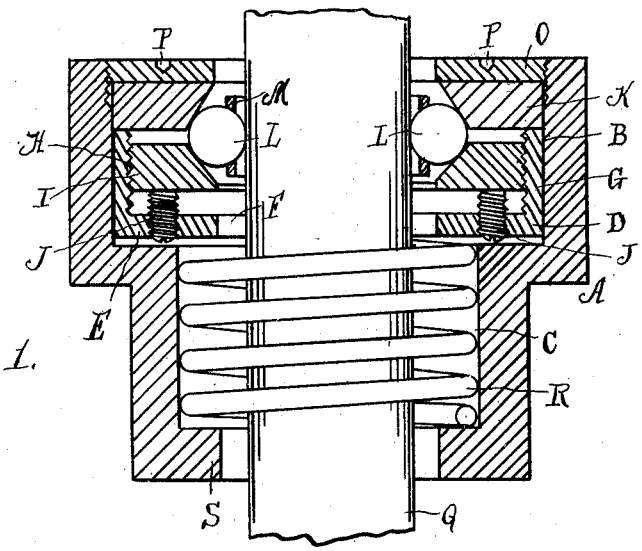
Figure 2:
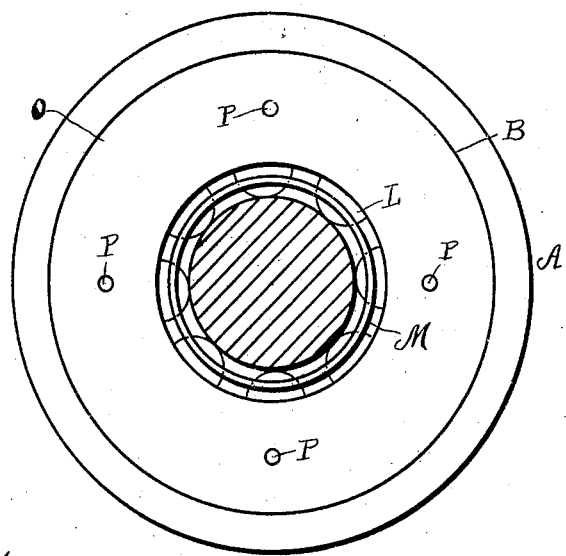
Figure 3:
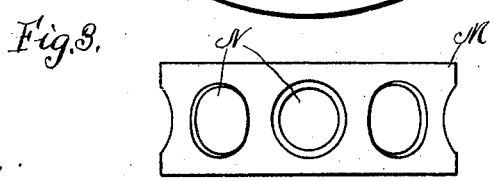

Figure 1 is a longitudinal sectional view of the bearing showing it applied to a spindle, said spindle and spring being shown in elevation. Fig. 2, a plan view thereof, and Fig. 3, a side elevation of the ball retainer.

In carrying out my invention as here embodied, A represents a housing having the bearing chamber B and a spring chamber C, the spring chamber being smaller in circumference than the bearing chamber.

D is the adjusting collar having a bottom E provided with a central opening F, and having the side walls G in which are formed the internal threads H. In this adjusting collar is threaded the conical bearing member I, which is held in any desired position by the locking screws J, which are threaded through the bottom E of the adjusting collar D. On top of the adjusting collar rests the upper conical bearing member K, which fits snugly in the bearing chamber B. Between these conical bearing members are mounted the balls L, and these are held in place by the ball retainer M, having the apertures N, whose side walls are beveled so that they flare outward. When this retainer is in position the balls L protrude through the apertures N. Above the upper conical bearing member K and threaded into the bearing chamber B is a collar O provided with wrench holes P.

Q is a spindle of the ordinary construction, the lower end of which generally rests in a bearing, the upper end carrying the bowl in which is placed the milk. This spindle rests between the balls L.

R is a spring coiled about the spindle Q, but which does not touch said spindle. One end of the spring rests upon the flange S formed with the spring chamber C, and on the upper end of said spring rests the adjusting collar D. In practice the spring R normally presses the adjusting collar D upward, carrying the lower conical bearing member I with it, thus pressing the balls L between the two conical bearing members L and K causing them to be moved toward the spindle Q, the strength of the spring R determining the vibration of said spindle Q. The tension of the spring is adjusted by threading the collar O into the bearing chamber B, which will press down upon the conical bearing member K, doing likewise with the adjusting collar B which rests upon the top of the spring R.

Of course I do not wish to be limited to the exact details of construction here shown, as these may be varied within the limits of the appended claims without departing from the spirit of my invention.

Having thus fully described my invention, what I claim as new and useful, is—

1. In a bearing, a casing, a coiled spring mounted therein, an adjusting collar also mounted in said casing and resting upon the spring, a conical bearing member mounted in the adjusting collar, means mounted on the adjusting collar for locking the conical bearing member, another conical bearing member mounted in the casing resting upon the adjusting collar, balls resting between said bearing members and means for regulating the tension of the spring.

2. In a bearing, a casing, a coiled spring mounted therein, an adjusting collar also mounted in said casing and resting upon the spring, a conical bearing member mounted in the adjusting collar, means mounted on the adjusting collar for locking the conical bearing member, another conical bearing member mounted in the casing resting upon the adjusting collar, balls resting between said bearing members and a collar provided with wrench holes threaded into the casing for adjusting the tension of the spring.

3. In a bearing, a casing, having a bearing chamber and a spring chamber formed therein, the spring chamber being of smaller diameter than the bearing chamber, a flange formed at the lower end of the casing, a spring mounted in the spring chamber, the lower end of which rests against the flange, an adjusting collar mounted in the bearing chamber having internal threads formed therewith, a conical bearing member threaded into said adjusting collar, another conical bearing member mounted in the bearing chamber resting upon the adjusting collar, balls mounted between the conical bearing members, and a collar for holding the last named bearing member in place adapted to regulate the tension of the spring.

4. In a bearing, a casing having a bearing chamber and a spring chamber formed therein, the spring chamber being of smaller diameter than the bearing chamber, a flange formed at the lower end of the casing, a spring mounted in the spring chamber, the lower end of which rests against the flange, an adjusting collar mounted in the bearing chamber having internal threads formed therewith, a conical bearing member threaded into said adjusting collar, locking screws for holding the adjustment of the conical bearing member, another conical bearing member mounted in the bearing chamber resting upon the upper end of the adjusting collar, balls resting between the conical bearing members, and a collar for holding the parts within the bearing chamber and adjusting the tension of the spring.

5. In a bearing, a casing having a bearing chamber and a spring chamber formed therein, the spring chamber being of smaller diameter than the bearing chamber, a flange formed at the lower end of the casing, a spring mounted in the spring chamber, the lower end of which rests against the flange, an adjusting collar mounted in the bearing chamber, said collar having a bottom provided with a central opening and side walls, the side walls having internal threads formed therein, a conical bearing member threaded in said adjusting collar, locking screws for holding said bearing member in its adjustment, another conical bearing member mounted in the bearing chamber resting upon the adjusting collar, balls resting between the conical bearing members, a ball retainer for spacing said balls, and a collar threaded in the bearing chamber for holding the parts therein and regulating the tension of the spring.

6. In a bearing, a casing having a bearing chamber and a spring chamber formed therein, the spring chamber being of smaller diameter than the bearing chamber, a flange formed at the lower end of the casing, a spring mounted in the spring chamber, the lower end of which rests against the flange, an adjusting collar mounted in the bearing chamber, said collar having a bottom provided with a central opening and side walls, the side walls having internal threads formed therein, a conical bearing member threaded in said adjusting collar, locking screws for holding said bearing member in its adjustment, another conical bearing member mounted in the bearing chamber resting upon the adjusting collar, balls resting between the conical bearing members, a ball retainer having apertures therein through which protrude the balls, and a collar provided with wrench holes threaded in the bearing chamber and engaging the upper surface of the upper conical bearing member.

In testimony whereof, I have hereunto affixed my signature in the presence of two subscribing witnesses.

HARRY B. GARMAN.

Witnesses:
ELLA GOODWIN,
TERESA GARMAN.